United States Patent
De Ruiter et al.

(10) Patent No.: US 6,402,819 B1
(45) Date of Patent: Jun. 11, 2002

(54) FRESH AIR FILTER

(75) Inventors: Ernest De Ruiter, Leverkusen; Jonas Toernblom, Erkrath, both of (DE)

(73) Assignee: MHB Filtration GmbH & Co. KG, Erkath (DE)

( * ) Notice: Subject to any disclaimer, the term of this patent is extended or adjusted under 35 U.S.C. 154(b) by 0 days.

(21) Appl. No.: 09/446,732

(22) PCT Filed: Jun. 24, 1998

(86) PCT No.: PCT/EP98/03867

§ 371 (c)(1),
(2), (4) Date: Mar. 16, 2000

(87) PCT Pub. No.: WO99/00192

PCT Pub. Date: Jan. 7, 1999

(30) Foreign Application Priority Data

Jun. 27, 1997 (DE) .......................... 197 27 295

(51) Int. Cl.[7] .......................... B01D 53/04; B01J 47/00
(52) U.S. Cl. .......................... 96/153; 96/154; 55/524; 55/DIG. 42; 95/128; 95/137
(58) Field of Search .......................... 210/506; 96/154, 96/153, 135; 95/128, 137, 285; 55/524, DIG. 13, DIG. 42

(56) References Cited

U.S. PATENT DOCUMENTS

| | | | | |
|---|---|---|---|---|
| 3,538,020 A | * | 11/1970 | Heskett et al. | 210/496 |
| 3,857,732 A | * | 12/1974 | Yoshino | |
| 3,925,248 A | * | 12/1975 | Moroni et al. | 502/159 |
| 4,131,544 A | * | 12/1978 | Elahi | 210/282 |
| 4,906,263 A | * | 3/1990 | von Blucher et al. | |
| 5,226,937 A | * | 7/1993 | Linnersten et al. | 55/DIG. 42 |
| 5,338,340 A | * | 8/1994 | Kasmark, Jr. et al. | 96/135 |
| 5,616,169 A | * | 4/1997 | deRuiter et al. | 95/90 |
| 5,871,569 A | * | 2/1999 | Oehler et al. | 96/153 |

FOREIGN PATENT DOCUMENTS

| | | | | |
|---|---|---|---|---|
| DE | 2244685 A | * | 4/1973 | |
| DE | 3904623 A | * | 8/1990 | |
| DE | 4034798 A | * | 5/1992 | |
| DE | 004239520 A1 | * | 5/1994 | |
| DE | 19521666 A1 | * | 1/1996 | |
| DE | 19521680 A | * | 1/1997 | |
| DE | 19534113 A | * | 3/1997 | |
| DE | 19601595 A | * | 7/1997 | |
| EP | 0659482 A | * | 6/1995 | |
| JP | 51140872 A | * | 12/1976 | |
| JP | 61 213052 A | * | 9/1986 | |

* cited by examiner

*Primary Examiner*—David A. Simmons
*Assistant Examiner*—Frank M. Lawrence
(74) *Attorney, Agent, or Firm*—Crowell & Moring LLP

(57) ABSTRACT

The present invention relates to a fresh air filter that comprises a highly air-permissive two- or three-dimensional support made of a cross-linked polymeric foam which includes pores of large dimensions. The support comprises joining portions which are coated with a layer of ion-exchange globules.

12 Claims, No Drawings

FRESH AIR FILTER

This application is a 371 of PCT application No. PCT/EP98/03867, filed on Jun. 24, 1998.

BACKGROUND OF THE INVENTION

It is known to use adsorption filters to remove undesirable substances from a gaseous or fluid mixture. For example, EP A-0 340 542 describes an adsorption filter which comprises a supporting frame with a covering of adsorber particles. The adsorber particles fixed on the supporting frame clean undesired substances out of gases or fluids carried through the filter. Such cleaning processes always represent an equilibrium between stationary phase and moving phase. For normal requirements the known adsorption filters are an adequate means for achieving a cleaning.

Modern industrial developments have resulted in increasingly stringent requirements with regard to clean air. Such industrial developments are, for example, the manufacture of highly sensitive products, such as the manufacture of chips in the gigabyte range in microelectronics and the manufacture of pharmaceuticals. Earlier cleaning techniques had concentrated on the removal of particles, and the additional removal of undesired gaseous substances was achieved by adding an adsorbent to the filters. With such adsorbers it was possible effectively to remove undesired substances, as it is described for example in EP-A 0 340 542. The known adsorption filters are not, however, able to remove the entire bandwidth of gaseous components from the clean air. Such gaseous components can be roughly divided into high-boiling substances on the one hand and very volatile substances on the other. High-boiling substances, such as water or phenol, for example, are easily and effectively removed from gas mixtures with conventional adsorption filters. Such conventional adsorption filters have, for example, adsorption particles of active carbon. The volatile substances, such as $SO_2$ and $NH_3$, behave entirely differently. They are only incompletely removed by the conventional adsorption filters, and such an equilibrium is established with the adsorption particles that the volatile substances are initially bound but later are released again. A lasting binding of such substances thus is not assured. One possibility of improving this insufficient adsorption is to impregnate the active carbon beforehand with acidic or basic adjuvants. If it is desired to remove $NH_3$, for example, from a gaseous mixture, such an impregnation can be performed with phosphoric acid; if $SO_2$, on the other hand, is to be removed, a previous impregnation with $K_2CO_3$ is a possibility. The undesired substances enter into a chemical reaction with the impregnant and are thus permanently and irreversibly removed from the gas mixture. At the same time the impregnant is consumed, with the result that, after a certain time, the exhaustion of the cleaning capacity occurs. The impregnation makes it possible to make filters with improved cleaning action available. But the impregnation of the impregnated adsorber particles reduces the original adsorption ability of these particles, in regard to both their capacity and the adsorption mechanism. The adsorber particles thus become slower in removing undesired substances from gas mixtures as compared with their original performance, and they remove lesser amounts thereof. To this extent a new equilibrium occurs on the adsorber particles between the adsorption originally available and the chemical adsorption of the impregnating substance. In the case of a large amount of impregnating substance a considerable degradation of the adsorption is found, especially when this impregnating substance is unfavorably distributed. If, on the other hand, an attempt is made to try impregnating with less impregnant, the adsorptive capacity is less impaired, but the early exhaustion of the impregnant must be expected.

Basically, the problem involved with clean air is very complex. In addition to gases (such as $H_2S$, $NO_2$, $SO_2$, $NH_3$ and $Cl_2$), ions ($SO_4^{2-}$, $NO_3^-$, $Cl^-$, $PO_4^{3-}$, $Na^+$, and $NH_4^+$) must be removed, about which it is not known in particular in what form they exist.

SUMMARY OF THE INVENTION

It is the object of the invention to provide a filter which, while having a good adsorption mechanism and capacity, will completely remove acid and basic gases and other impurities, even in trace amounts, from gas streams without any problems, and will permit the preparation of high-purity air for the purposes mentioned above.

This object is achieved by a filter with a high permeability to air, on which ion exchanger beads are fixed. The support is preferably a large-pore reticulated polymer foam made up of strings enveloped by a layer of ion exchangers. The support, however, can also be flat and be composed of a highly air permeable textile support material such as woven fabric, knits or nonwoven webs on which the ion exchanger spherules are fixed in the same manner as is known in the case of the so-called "spherical carbon" used as active carbon beads (DE-C-33 04 349).

DETAILED DESCRIPTION OF PREFERRED EMBODIMENTS

The ion exchanger beads can be strongly basic anion exchangers or strongly acidic cation exchangers. Such ion exchangers are known (literature reference: Winnacker-Küchler, 4th ed., vol. 1, and Römpp, 9th ed. of 1995). They are almost exclusively in the form of spheres of a size of up to 1 millimeter, which are used in bulk. The spheres consist of porous or swellable polymers, mostly on the basis of styrene, usually crosslinked in the form of styrene/divinylbenzene polymers bearing chemical groups with exchangeable ions which permit the desired exchange. In cation exchangers the chemical groups are usually sulfone groups, while anion exchangers contain quaternary ammonium groups. Ion exchangers with these chemical groups are strong ion exchangers.

Ion exchangers are used almost exclusively in wet form for cleaning wet media, especially for water purification. It is therefore surprising and unexpected by the person skilled in the art that ion exchangers also have an extraordinarily great separating power in air and even in a very dry atmosphere of less than 40% relative humidity, and can remove ions—which are probably present in the form of microdroplets or microdusts—formaldehyde, and other compounds that are barely perceptible by the sense of smell, but are no longer analytically detectable.

Reticulated polymer foams with large pores are known. These are predominantly polyurethane (PUR foams). Large-pore reticulated PUR foams have a density of 20 to 60 g/liter and pores measuring 1.5 to 3 mm. The pore size is also usually stated in Pei, i.e., pores per inch, and accordingly they have, for the purposes of the invention, a porosity of 8 to 30 ppi. Suitable as supports for the ion exchange beads also include large-pore reticulated polyolefin foams, especially those consisting of polyethylene and polypropylene. With regard to the size of the pores and the reticulation, the same considerations apply to the polyolefin foam as were stated above in connection with the PUR foam. Especially suitable are polyolefin foams which are modified hydrophilically by additional additives. Such reticulated polyolefin foams are known. They have been marketed, for example, by the firm of Troplast in Troisdorf.

Reticulated foams have almost no walls, but consist mostly of a lattice of strings forming cages having a diameter of about 1 to 5 mm. After they are coated with ion exchanger beads and with adsorber particles if desired, the reticulated foams have a comparatively large stiffness.

Depending on the material from which the supports are constructed, the ion exchanger beads can be affixed directly thereon, or an adhesive may be required. Adhesive is used especially with air-permeable textile supports or with the reticulated PUR foams. Which adhesives or glues are used depends especially on the intended manner of regeneration of the ion exchangers for the exhausted filters. Suitable adhesives include known dispersion adhesives, especially those based on acrylic acid derivatives, polyurethanes or polyvinyl acetates, as well as hot-melts or adhesive systems. The latter include Bayer's® Imprint® High Solid PUR reactive products, especially those of the components Impranil® HS 62 and Imprafix® C. While the adhesive is applied to the textile supporting material preferably by means of a template in a dot pattern of glue spots, application of the adhesive to the foams is performed as usual by impregnating them with the adhesive dispersion and squeezing them out. In this way the chemical stability of the foams, especially their resistance to hydrolysis, is determined substantially by the adhesive that is applied. A hydrolysis resistant adhesive is available, for example, in the form of Levacast 43131 N of Bayer® AG. This is a polymeric isocyanate which is crosslinked by moisture and was developed for the manufacture of shoe upper materials. When this product is used it is recommendable to dry the ion exchangers only to the point that they can be sprinkled, because the residual moisture promotes the crosslinking. After the ion exchanger beads are strewn on, the adhesive hardens completely within a few hours. This has the advantage that no elevation of temperature is required for the crosslinking.

When large-pored reticulated polyolefin foams are used as supports, an adhesive may as a rule be omitted because, when heated, the polyolefin lattice becomes sufficiently tacky to durably fix the (dried) ion exchanger granules thereon without adhesive. The ion exchanger beads are distributed such that the fixed beads have hollow spaces between them which are from 0.1–3 times the average bead diameter in size, which includes hollow spaces which are from 0.5–1 times the average bead diameter in size. It is of course important to prevent the support from sagging. This is accomplished by first filling the polyolefin foam completely with the ion exchanger beads; then the resulting "fully stuffed" support can no longer collapse or shrink. After cooling, the excess can easily be knocked out, since only the particles that came in contact with the support when it was tacky will remain fixed. In this manner, any bodies, even plates, can be formed. If they are shrunk into a suitable shrinking film and the outer side is reinforced, for example with an appropriate wrapping, a functional ion exchanger is obtained in a very simple manner. It is necessary that the ion exchanger granules be able to withstand the temperature at which the polymer support becomes tacky. In the case of a polyolefin this temperature is around 155 to 160° C. Ion exchangers are normally offered with about 50% moisture. In the drying, therefore, a shrinkage occurs, which is especially the case with the weakly crosslinked gel types. If the pores are not sufficiently large, this can lead to problems when rewetting occurs, so the diameter should therefore amount to at least three times the particle diameter.

The filters according to the invention, charged with strongly basic anion exchangers, are especially suitable for cleaning air streams of gaseous acid substances, especially of sulfur dioxide, to produce clean air. But they also make possible the removal of formaldehyde and prevent the odor which attaches to active carbon filters which can be smelled in the air flowing through them. This odor is no longer perceptible in the clean air if a filter charged with strongly basic anion exchangers according to the invention is connected downstream of the active carbon filter.

The filters charged with strongly acidic cation exchangers according to the invention permit the effective removal of gaseous basic substances, especially ammonia, from air streams. The two types of filters for clean air can also be connected in tandem. It is possible to envelop the large-pore reticulated polymer foam both with anion exchanger beads and with cation exchanger beads, but is not recommended if the filters are to be regenerated in the usual manner with aqueous media, because this, as is well known, is effected with different media in each of the two types.

Surprisingly it was found that used-up filters, i.e., filters with the cation exchanger beads, whose ion exchange capacity is greatly reduced, can also be effectively regenerated thermally. With a brief regeneration with hot air up to about 150° C., the $NH_3$ capacity in strongly acid cation exchangers was completely restored. Similar effects are also to be observed in the anion exchangers. For this type of regeneration both cation exchanger and anion exchanger beads can be fixed on the highly air-permeable support.

EXAMPLE 1

A reticulated polyolefin foam in the form of a plate measuring 40×30×2 cm, density about 30 g/liter, porosity 15 ppi, was covered in a photographic pan with dry ion exchanger beads (gel-type cation exchanger composed of styrene and divinyl benzene, bead diameter 0.3 to 0.6 mm), so that the foam was completely filled with the beads. Then it was all placed in a drying oven heated at 165° C. While a foam without ion exchanger sags after 2 to 3 minutes, the foam filled with the ion exchangers retained its dimensions, since due to the filling it was unable to shrink. After 60 minutes it was cooled and the excess was shaken out. About 150 grams of ion exchanger per liter of foam was permanently affixed. The self-supporting plates had a resistance to flow that was 8 to 10 times less than a charge of loose beads having same capacity.

EXAMPLE 2

A plate measuring 20×10 ×2 cm of a reticulated PUR foam with 8 to 10 ppi, density about 30 g/liter, was squeezed out with Levacast 43 131 N of Bayer AG (squeeze-out effect 100%), and on it was spread a macroporous cation exchanger (ratio styrene/divinyl polymer/sulfonic acid groups about 1:1) which had been dried to 30% moisture, in an amount of about 130 grams per liter of foam support. The adhesive completely sets at room temperature in air in less than 3 hours.

From this material a plate measuring 20×20 cm was punched out, and air containing 25 $\mu g/m^3$ of $NH_3$ was passed through it at a rate of 40 cm/second. After a week the average $NH_3$ concentration downstream from the filter was still less than 5 $\mu g/m^3$. Behind the filter no more $NH_3$ could be detected.

EXAMPLE 3

Like Example 2, but an anion exchanger based on styrene/divinyl benzene with —$N^+$—$(CH_3)_3$ groups and a capacity of 1.2 meq/cm$^3$ was used. Behind the filter no more $SO_2$ could be detected. An air stream which contained 50 μg/m$^3$ $SO_2$ was passed through the filter at a velocity of 10 cm per second. One week later the average $SO_2$ concentration in the clean air produced was still under 10 μg/m$^3$.

What is claimed is:

1. A filter for cleaning air, said filter comprising a porous, air-permeable three-dimensional support having ion exchanger beads affixed thereon, said support comprising a large-pore, reticulated polyolefin foam and the affixation of the ion exchanger beads is effected by heating the polyolefin foam such that the polyolefin lattice becomes sufficiently tacky to durably fix the ion exchanger beads thereon, said ion exchanger beads being distributed such that the fixed beads have hollow spaces between them which are from 0.1 to 3 times the average bead diameter in size.

2. A filter according to claim 1, wherein the fixed beads have hollow spaces between them which are from 0.5 to 1 times the average bead diameter in size.

3. A filter according to claim 1, wherein said support comprises a network of polymeric strands which are enveloped by a layer of the ion exchanger beads.

4. A filter according to claim 1, wherein the ion exchanger beads are strongly basic anion exchangers.

5. A filter according to claim 1, wherein the ion exchanger beads are strongly acid cation exchangers.

6. A filter according to claim 1, wherein said polyolefin foam is hydrophilically modified.

7. A filter according to claim 1, wherein said polyolefin foam has a porosity of from 8 to 30 ppi.

8. A filter according to claim 1, further comprising an adhesive for securing the ion exchanger beads to the support.

9. A filter according to claim 8, wherein said adhesive comprises a di- or polyisocyanate prepolymer which crosslinks in the presence of moisture.

10. A method of cleaning a gas stream to remove at least one contaminant selected from the group consisting of gaseous basic substances, gaseous acidic substances and formaldehyde, said method comprising the step of passing said gas stream through a filter according to claim 1.

11. A method according to claim 10, wherein sulfur dioxide is removed from said gas stream.

12. A method according to claim 10, wherein ammonia is removed from said gas stream.

* * * * *